United States Patent [19]

Lockwood

[11] 4,436,952
[45] Mar. 13, 1984

[54] CABLE CLAMPING DEVICE INTEGRALLY FORMED WITH PLASTIC MOLDED ELECTRICAL BOX

[76] Inventor: Alan C. Lockwood, 4526 Darlow Ave., Rosemead, Calif. 91770

[21] Appl. No.: 335,247

[22] Filed: Dec. 28, 1981

[51] Int. Cl.³ .............................................. H02G 3/08
[52] U.S. Cl. .............................. 174/65 R; 339/103 R
[58] Field of Search ................. 174/65 R; 339/103 R; 220/3.2

[56] References Cited

U.S. PATENT DOCUMENTS

| | | | |
|---|---|---|---|
| 4,304,958 | 12/1981 | Neff et al. | 174/65 R |
| 4,306,109 | 12/1981 | Nattel | 174/65 R X |
| 4,316,999 | 2/1982 | Nattel | 174/65 R |
| 4,335,271 | 6/1982 | Haslbeck | 174/65 R |

*Primary Examiner*—G. P. Tolin
*Assistant Examiner*—D. A. Tone
*Attorney, Agent, or Firm*—Edward A. Sokolski

[57] ABSTRACT

A cable clamping device is integrally formed with a plastic electric box such as a switch box or the like. This clamping device is in the form of a finger member which is resiliently hinged to the box at one end thereof, and which resiliently moves on this hinge towards the interior of the box when urged by a cable end pressed against the outer wall of the clamping device. With such urging, the cable is permitted by the finger member to enter the box and is clamped between the finger and a wall of the box. A tab is provided on the free end of the clamping finger for use in prying the finger away from the cable. Stops are further provided along the inner wall of the finger clamp operating in conjunction with flat strip members which extend from an inner wall of the box to limit the inward travel of the finger clamp, thereby preventing overbending thereof. Further, the finger clamp is given resiliency along with high strength properties by molding a teardrop-shaped groove extending through half the thickness thereof and running between the opposite end of the finger, thereby providing a minimum cross section area at the end of the finger engaging the cable, to afford uniform bending throughout the lengthwise extent of the fingers to avoid overstressing of the cable at any single point.

8 Claims, 7 Drawing Figures

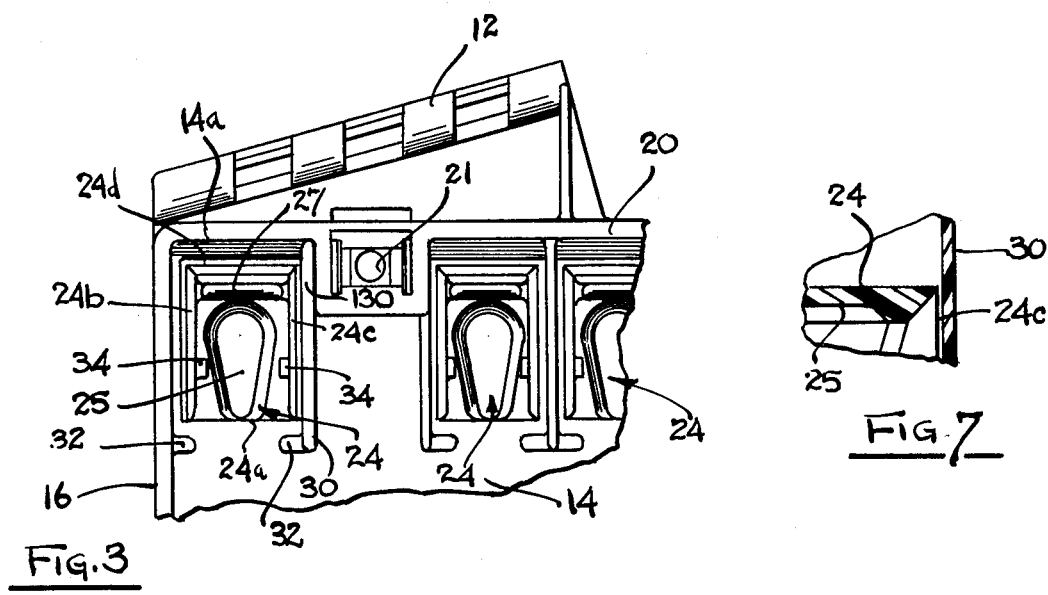
Fig. 3
Fig. 7
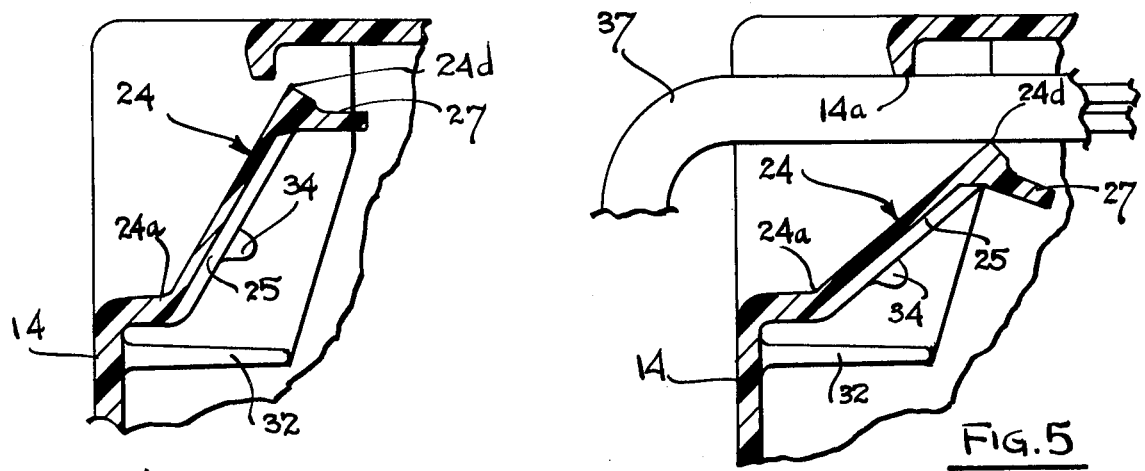
Fig. 4
Fig. 5
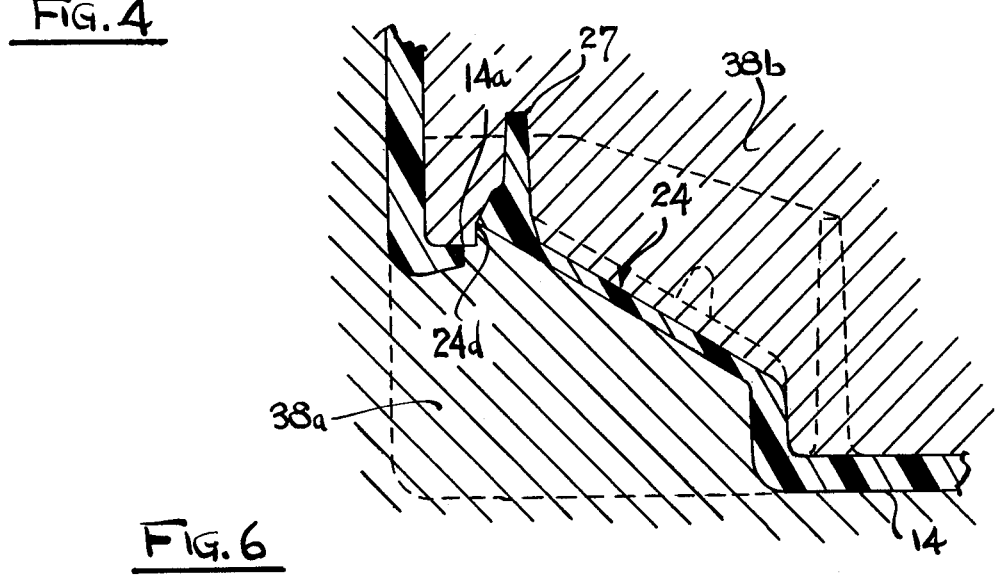
Fig. 6

CABLE CLAMPING DEVICE INTEGRALLY FORMED WITH PLASTIC MOLDED ELECTRICAL BOX

This invention relates to plastic electrical boxes such as switch boxes, and more particularly to a resilient finger clamp integrally molded with a plastic box which is employed to clamp a cable or the like to the box.

In the fabrication of plastic boxes, clamping devices are commonly used to clamp cables to the walls of the box permitting the cable to enter the interior of the box through an appropriate aperture formed therein. Such clamping devices generally take the form of metal fingers, or a single such finger which is attached to the wall of the box adjacent to the aperture formed therein, such as to clamp the cable against the side of such aperture. Prior art such clamping devices are described in the following U.S. patents: Nos. 1,288,902 to Hyatt et al; 1,295,249 to Wulkan; 1,277,876 to Detwiler; 1,667,814 to Morgenstern et al.; 2,457,235 to Hoehn; 1,708,827 to Black et al.; 2,458,408 to Paige; 2,556,977 to Paige; and 2,706,647 to Gillespie.

All of these devices have the disadvantage of requiring the assembly of the clamping device to the box with the added expense involved, and the added problem of such devices tending to become detached from the boxes with which they are used, either with handling or use in the field. Also, additional labor is required to tighten certain of these clamps. Further, certain of these devices employ clamps which dig into the cable and can possibly cause damage thereto. In addition, with many of these devices it is difficult to remove the cable from the box once it has been installed therein.

U.S. Pat. No. 3,783,176 to Lund et al. provides a clamp which is integrally formed with a sheet metal box which obviates the disadvantage of non-integral construction pointed out above. This metal clamp, however, tends to dig into the wall of the conduit in situations where there is not a metal outer conduit employed, and thus can cause damage to the cable insulation. Further, with such a sheet metal clamp, difficulties could be experienced in releasing the clamp from the cable once installed.

In recent years, the use of plastic molded boxes has come into widespread use, such boxes having many advantages over metal boxes in view of their insulative properties and the facility and economy of plastic molded fabrication. With such molded boxes, it is highly desirable to have the cable clamp integrally molded with such boxes to lessen the cost and minimize the time and operations involved in fabrication and installation. In employing such molded plastic clamping members, it is essential that these clamping members are resilient enough to permit sufficient bending to allow various size cables to enter the box and yet tightly clamp such cable to the box. At the same time, such clamping members must have adequate strength so that they will not break away from the box when stressed by the force of the cable applied thereagainst and be capable of resisting the pull out of the cable. In addition, it is important that means be provided in such a clamping device for permitting the removal of the cable from the box or to relocate it therein, should this be necessitated where repair or modification of the wiring is required.

The device of the present invention overcomes the shortcomings of the prior art and affords substantial improvement in an integrally molded plastic clamping device for a switchbox or the like. This improvement is achieved by fabricating the clamping device in the form of a hinged finger member which is hinged to the box on one end thereof and which is free along the sides and the other end thereof, such that it can be moved inwardly from the outside of the box towards the interior of the box when force is applied thereagainst. The clamping finger is effectively made resilient and at the same time of sufficient strength to resist breakage by applying a teardrop cutout on one wall thereof which extends through approximately one-half the thickness of the clamp from substantially one end to the opposite end thereof. This teardrop shape is made such that the wider end of the teardrop is towards the free end of the clamp which engages the cable, so as to spread the applied load to avoid damage to the finger by overstressing. Further, the molding of the fingers with only one end attached to the box is faciliated by tapering the side edges of the fingers to a knife edge, which permits enough of the associated portion of the plastic mold to form a relatively small opening between these edges and the opposing walls of the box. Further, such construction enables the use of a simple two-piece mold without the need for cams or cylinders to operate any part of the mold proper. Additionally, a tab is provided on the free end of the clamp member which permits the clamp to be pried away from the cable such that the cable can be removed and replaced, or repositioned as may be necessary. Means are also provided in the device of the invention for preventing the clamp from being overbent in situations where a heavy cable is inserted into the opening. This end result is achieved by stop projections formed on the inner walls of the clamping fingers which operate in conjunction with strips which extend from the inner walls of the box and against which the stop projections abut to establish a bend limiting position for the clamps.

It is therefore an object of this invention to facilitate the fabrication of plastic molded switch boxes by providing cable clamps which are integrally molded with such boxes.

It is another object of the invention to provide a cable clamp for a switch box which does not require any tightening by the user.

It is a further object of this invention to provide improved integrally formed cable clamps for switch boxes and the like which have improved resiliency and are less subject to breakage than such clamps of the prior art.

It is still another object of this invention to provide an improved integrally formed cable clamp for a molded plastic box in which means are provided for enabling the ready unclamping of a cable for removal or repositioning in the box.

Other objects of this invention will become apparent as the description proceeds in connection with the accompanying drawings of which:

FIG. 3 is a partial cut-away view in elevation of a portion of the rear of the box of FIG. 1;

FIG. 4 is a cross-sectional view taken along the plane indicated by 4—4 in FIG. 2;

FIG. 5 is a cross-sectional view taken along the plane indicated by 5—5 in FIG. 2;

FIG. 6 is a schematic view illustrating a portion of the clamp of the preferred embodiment being molded; and FIG. 7 is a cross-sectional view taken along the plane indicated by 7—7 in FIG. 2.

Figure 1:
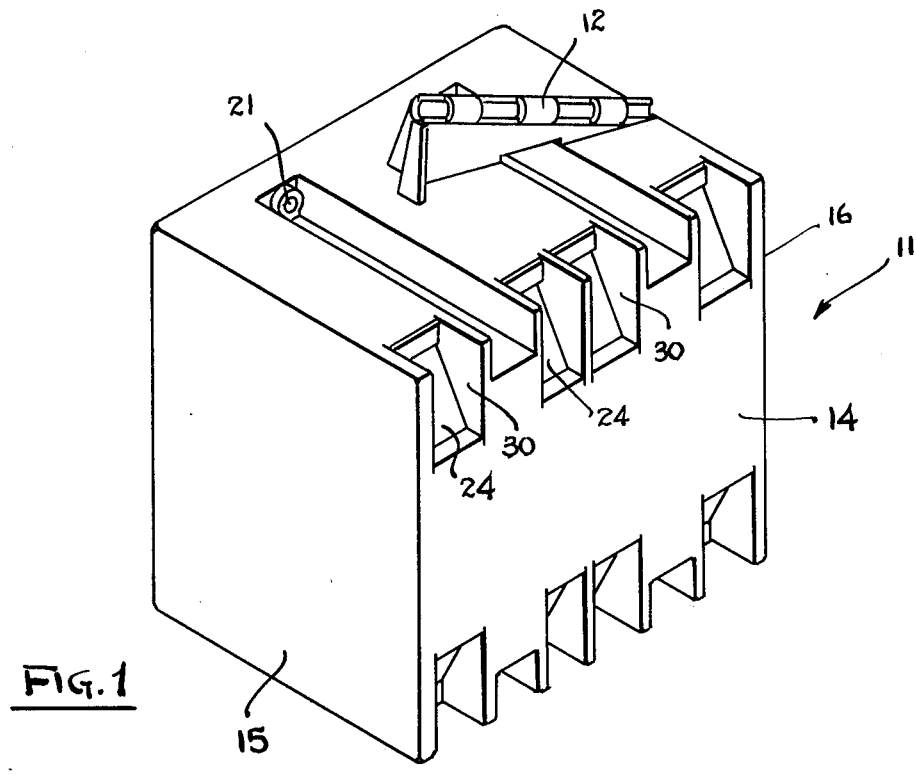
FIG. 1 is a perspective view of a preferred embodiment of the invention.
Figure 2:
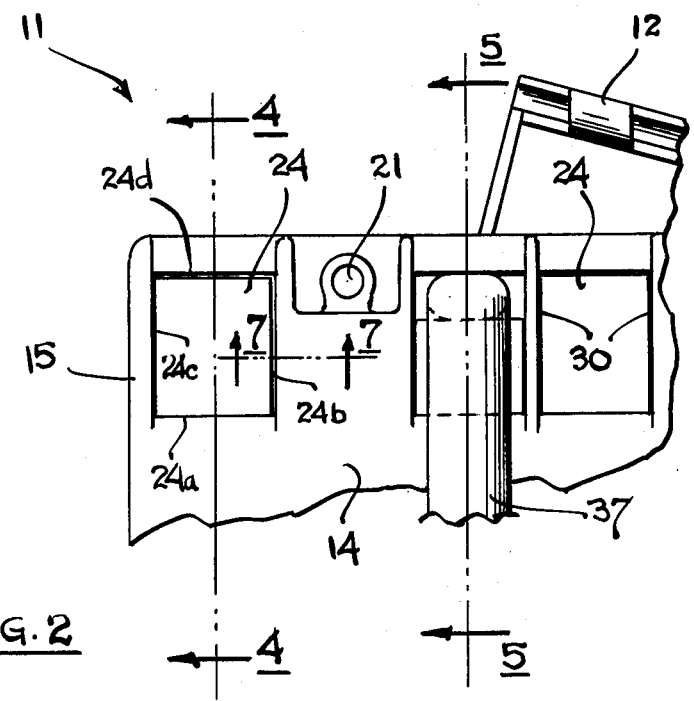
FIG. 2 is a cut-away elevational view of a front wall portion of the box of FIG. 1.

Referring now to FIGS. 1–5 and 7, a preferred embodiment of the invention is illustrated. Switch box 11 is molded from a thermoplastic material, such as a rigid PVC. The box is rectangular in shape and has a rear wall 14, a pair of opposing side walls 15 and 16 and an open front portion having a rim 20 and mounting receptacles 21 to which a cover plate (not shown) is attached. Integrally formed with the box are a plurality of finger clamping members 24 for clamping cable 37 to be fed into the box, as can be seen in FIGS. 2 and 5. Bracket 12, which receives a nail for use in attaching the box to a stud wall or the like, is also provided.

The finger clamps are hinged to the box at one end thereof 24a, with the side edges 24b and 24c being spaced from the box by narrow slits. The top edge 24d of the clamp is also free and spaced from the box by a narrow slit. The side edges 24b and 24c are tapered at approximately a 45° angle to form knife edges, as best can be seen in FIG. 7. The inner wall of the clamping finger has a recess or groove 25 formed therein, this groove being in the shape of a teardrop with the wider portion thereof near the free edge 24d and the narrower portion near the hinged edge 24a. The recess or groove 25 is preferably made to about half the thickness of the clamp. A tab 27 is provided at the free end of the clamp, as best can be seen in FIGS. 3 and 4, to facilitate the opening of the clamp to enable the removal or repositioning of the cable. A rib portion 30 forming a side wall is provided adjacent to the clamp to confine the cable. Strips 32, which extend inwardly from the inner surface of the front wall 14 of the box at an angle substantially normal to the box surface, are provided to limit the travel of the clamps to avoid their overbending. Projections 34 are provided along the inner walls of the clamp, these projections abutting against strips 32 when the clamp is in its fully extending position.

A cable 37 is inserted in the box as shown in FIGS. 2 and 5 by being pressed against the outer wall of the clamp, and is then held in clamping engagement with the box by the clamp by virtue of the resiliency of the clamp, the cable being held between a serrated edge portion 14a of the box and the end of the clamping finger. The teardrop groove 25 provides a minimum cross section at the cable engaging end to spread the applied load so as to make for a resilient clamping finger and avoid overstressing of the plastic material. The use of this teardrop form rather than varying the thickness of the clamping finger from end to end, as is typically done in the prior art, facilitates the molding process, allowing the material to flow more readily in the mold.

Referring now to FIG. 6, the molding of the finger clamp portion of the box is illustrated. The mold employed is a simple mold, employing a bottom piece 38a and a top piece 38b. As can be seen, metal to metal contact is provided between the free edge portion 24d of the clamp and the edge portion 14a of the box. The tapering of the edges 25 on a 45° angle allows enough steel in the mold to protrude an opening of no more than about 0.030 inches, affording a maximum width clamping finger, thus making for the greater strength needed for the single hinged structure employed.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a molded electrical box having a plurality of walls with broad outside surfaces a clamping device integrally formed with said box for clamping a member to said box, said member passing from the outside of the box to the interior thereof through an aperture formed in a wall of said box, said clamping device comprising a single resilient finger member hinged at one end thereof to one of the walls of said box and extending away from said wall at an acute angle relative to the broad outside surface of said wall, said finger member being free of the box at the sides and the other end thereof, said finger member being positioned in said aperture, tab means formed on said free other end of the finger member for use in prying said finger member away from said clamped member to permit the removal or repositioning thereof, said tab means being in the form of a strip having at least one flat surface, the flat surface of said tab means being positioned directly opposite an inside wall of said box, means for establishing a limiting position to the bending of said finger member comprising a projection formed on a surface of said finger member facing towards the interior of said box, and strip means extending from an inner wall of said box against which the projection abuts with the finger member in said limiting position, the member passing from the outside to the inside of the box being clamped in said aperture between the finger member and the wall portions forming said aperture.

2. The clamping device of claim 1 wherein the sides of said finger member are tapered to form knife edges.

3. The clamping device of claim 1 wherein narrow slits are formed between the sides of said finger member and the sides of said aperture and between said one end of said finger member and an end of said aperture.

4. The clamping device of claim 1 wherein said clamped member is a cable.

5. The clamping device of claim 1 and further including a rib portion formed on said box along said aperture to confine said cable in said aperture.

6. The clamping device of claim 1 and further including a serrated portion formed on said wall along the edge of said apertured portion opposite the free other end of said finger member.

7. In a molded electrical box a clamping device integrally formed with said box for clamping a member to said box, said member passing from the outside of the box to the interior thereof through an aperture formed in a wall of said box, said clamping device comprising a single resilient finger member hinged at one end thereof to a wall of said box, said finger member being free of the box at the sides and the other end thereof, said finger member being positioned in said aperture, a groove being formed in one surface of said finger member, said groove running between the free and hinged ends of the finger member and being in the general shape of a teardrop with the wider portion of the groove being towards the free other end of said finger member, tab means formed on said free other end of the finger member for use in prying said finger member away from said clamped member to permit the removal or repositioning thereof, means for establishing a limiting position to the bending of said finger member comprising a projection formed on a surface of said finger member facing towards the interior of said box, and strip means extending from an inner wall of said box against which the projection abuts with the finger member in said limiting position, the member passing from the outside to the inside of the box being clamped in said aperture between the finger member and the wall portions forming said aperture.

8. The clamping device of claim 7 wherein said groove extends through approximately half the thickness dimension of said finger member.

* * * * *